(12) United States Patent
McFarland et al.

(10) Patent No.: US 10,983,504 B2
(45) Date of Patent: Apr. 20, 2021

(54) CONTROL OF A CHAIN OF MACHINES, INCLUDING AN ADDITIVE MANUFACTURING MACHINE, IN THE MANUFACTURE OF A WORKPIECE

(71) Applicant: RENISHAW PLC, Gloucestershire (GB)

(72) Inventors: Geoffrey McFarland, Wickwar (GB); Ramkumar Revanur, Stafford (GB); Mark Buckingham, Thornbury (GB)

(73) Assignee: RENISHAW PLC, Wotton-Under-Edge (GB)

( * ) Notice: Subject to any disclaimer, the term of this patent is extended or adjusted under 35 U.S.C. 154(b) by 0 days.

(21) Appl. No.: 15/761,247

(22) PCT Filed: Sep. 29, 2016

(86) PCT No.: PCT/GB2016/053036
§ 371 (c)(1),
(2) Date: Mar. 19, 2018

(87) PCT Pub. No.: WO2017/055854
PCT Pub. Date: Apr. 6, 2017

(65) Prior Publication Data
US 2018/0275634 A1 Sep. 27, 2018

(30) Foreign Application Priority Data

Sep. 30, 2015 (IN) .......................... 3140/DEL/2015
Nov. 12, 2015 (EP) .................................... 15194203

(51) Int. Cl.
*G05B 19/4099* (2006.01)
*B33Y 50/02* (2015.01)
(Continued)

(52) U.S. Cl.
CPC ........ *G05B 19/4099* (2013.01); *B29C 64/393* (2017.08); *B33Y 50/02* (2014.12);
(Continued)

(58) Field of Classification Search
CPC ...... G05B 19/4099; G05B 2219/35134; G05B 2219/49007; B33Y 50/02; B33Y 30/00; B33Y 30/32189; B29C 64/393
(Continued)

(56) References Cited

U.S. PATENT DOCUMENTS 9,308,726 B2  4/2016  Hays et al.
9,604,412 B2  3/2017  Donaldson et al.
(Continued)

FOREIGN PATENT DOCUMENTS

CN    103056362 A    4/2013
CN    103252999 A    8/2013
(Continued)

OTHER PUBLICATIONS

Manogharan G., "Hybrid Manufacturing: Analysis of Integrating Additive and Subtractive Methods", pp. 1-204, 2014.
(Continued)

*Primary Examiner* — Kenneth M Lo
*Assistant Examiner* — Michael W Choi
(74) *Attorney, Agent, or Firm* — Oliff PLC (57) ABSTRACT

This invention concerns apparatus for generating instructions for machines of a manufacturing chain used to manufacture a workpiece. The apparatus comprising a processor arranged to receive a model based definition (MBD) of a workpiece including geometric dimensions and tolerances; receive inputs setting an additive build design for building the workpiece based upon the geometric dimensions; generate additive instructions for an additive manufacturing machine of the manufacturing chain based upon the additive (Continued)

build design; determine a prospective intermediate workpiece product expected from an additive build in accordance with the additive build design; determine differences between the prospective intermediate workpiece product and the model based definition of the workpiece; and generate further instructions for at least one further machine of the manufacturing chain based upon the differences.

17 Claims, 7 Drawing Sheets

(51) Int. Cl.
  *B29C 64/393* (2017.01)
  *B33Y 30/00* (2015.01)
(52) U.S. Cl.
  CPC ..... *B33Y 30/00* (2014.12); *G05B 2219/32189* (2013.01); *G05B 2219/32203* (2013.01); *G05B 2219/35134* (2013.01); *G05B 2219/49007* (2013.01); *G05B 2219/49016* (2013.01); *G05B 2219/49029* (2013.01); *G05B 2219/49036* (2013.01); *Y02P 90/02* (2015.11)
(58) Field of Classification Search
  USPC .......................................................... 700/98
  See application file for complete search history.

(56) References Cited

U.S. PATENT DOCUMENTS

| | | | |
|---|---|---|---|
| 9,855,698 B2 | 1/2018 | Perez et al. | |
| 10,131,102 B2 | 11/2018 | Quere et al. | |
| 2002/0147521 A1 | 10/2002 | Mok et al. | |
| 2004/0107019 A1* | 6/2004 | Keshavmurthy | ....... G06F 19/00 700/118 |
| 2010/0305742 A1* | 12/2010 | Twelves, Jr. | .......... B23P 21/004 700/112 |
| 2013/0101729 A1 | 4/2013 | Keremes et al. | |
| 2013/0108726 A1* | 5/2013 | Uckelmann | ......... B29C 67/0007 425/174.4 |
| 2015/0024233 A1 | 1/2015 | Gunther | |
| 2015/0045924 A1 | 2/2015 | Cluckers et al. | |
| 2015/0093283 A1 | 4/2015 | Miller et al. | |
| 2015/0251356 A1 | 9/2015 | Batchelder | |
| 2016/0055260 A1* | 2/2016 | Floyd | ................... G06F 16/9024 707/798 |
| 2016/0059315 A1* | 3/2016 | Baudimont | ........... B22F 3/1055 419/28 |
| 2016/0114542 A1* | 4/2016 | Quere | ................... B29C 64/106 264/1.1 |
| 2017/0021452 A1* | 1/2017 | Tanaka | ................... B29C 70/386 |
| 2017/0037686 A1* | 2/2017 | Oxford | ................... E21B 10/42 |
| 2018/0126629 A1* | 5/2018 | Staal | ..................... B33Y 10/00 |

FOREIGN PATENT DOCUMENTS

| | | |
|---|---|---|
| CN | 104275800 A | 1/2015 |
| CN | 104363860 A | 2/2015 |
| EP | 1750190 A1 | 2/2007 |
| JP | H10-24495 A | 1/1998 |
| JP | 2003-136605 A | 5/2003 |
| JP | 2016-533925 A | 11/2016 |
| WO | 2006/024844 A2 | 3/2006 |
| WO | 2013/167904 A1 | 11/2013 |
| WO | 2014/195654 A1 | 12/2014 |
| WO | 2014/207454 A1 | 12/2014 |
| WO | 2015/019070 A1 | 2/2015 |
| WO | 2015/106836 A1 | 7/2015 |
| WO | 2016/193742 A1 | 12/2016 |

OTHER PUBLICATIONS

Jan. 13, 2017 International Search Report issued in International Patent Application No. PCT/GB2016/053036.

Jul. 4, 2016 Search Report issued in European Patent Application No. 15194203.

* cited by examiner

CONTROL OF A CHAIN OF MACHINES, INCLUDING AN ADDITIVE MANUFACTURING MACHINE, IN THE MANUFACTURE OF A WORKPIECE

FIELD OF THE INVENTION

This invention relates to improvements in or relating to the control of a chain of machines, including an additive manufacturing machine, in the manufacture of a workpiece. The invention has particular application to apparatus and control software for generating instructions for controlling machines of the chain including the additive manufacturing machine.

BACKGROUND TO THE INVENTION

Additive manufacturing or rapid prototyping methods for producing parts comprise layer-by-layer solidification of a flowable material. There are various additive manufacturing methods, including powder bed systems, such as selective laser melting (SLM), selective laser sintering (SLS), electron beam melting (eBeam) and stereolithography, and non-powder bed systems, such as fused deposition modelling.

In selective laser melting, a powder layer is deposited on a powder bed in a build chamber and a laser beam is scanned across portions of the powder layer that correspond to a cross-section (slice) of the workpiece being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one workpiece can be built, the workpieces spaced apart in the powder bed.

Computer programs are used to convert geometric data, such as CAD or STL file formats, defining a workpiece into scan data defining how the additive manufacturing apparatus operates to build the part. Generation of the scan data may comprise determining cross-sections (slices) of the workpiece corresponding to areas to be consolidated in each layer and how the energy beam is to be scanned across the areas to solidify the material to form the slices. Software, such as Magics of Materialise Nev., include operations for slicing a workpiece defined in a StereoLithography/Standard Tessellation language (STL) file format to identify slices of the workpiece to be built and for defining scan paths and scan parameters for a laser or electron beam. The planning software may include operations for orientating parts and for generating supports for supporting the workpiece during the build.

It is known to import geometric design data into the computer program for planning of the additive manufacturing process, the geometric design data defining the part(s) integrated with fixtures that are used in subsequent, such as subtractive, processes carried out after the additive manufacturing process. For example, WO2013/0167904 discloses an article built using additive manufacturing comprising a plurality of dental abutments each of which is attached to a common location hub via a connecting bar. The hub comprises two gross-orientation bores used to ensure the correct orientation of the article in a clamp during subsequent processing. The machines used in subsequent processing can then be appropriately programmed to carry out the required subtractive process based upon prior knowledge of the fixture that is to be built using the additive manufacturing process.

US2010/0305742 discloses an integrated additive manufacturing cell that combines conventional manufacturing technologies with additive manufacturing technologies. The additive process allows specific fixturing tabs to be grown on the workpiece depending on subsequent machining operations to simplify handling.

US2015/0024233 A1 discloses methods and apparatuses to fabricate additive manufactured parts with in-process monitoring. As parts are formed layer-by-layer, a 3D measurement of each layer or layer group is acquired. The as-built measurement data may be compared to the input geometrical description of the desired part shape. Comparing typically includes calculating a measured difference between the geometric description and the dimensional data. The measured difference may be used to affect further processing. If the measured difference is out of tolerance, comparing may include indicating the need for post-processing, such as inspecting, removing a spurious feature, decomposing, destroying or marking the indicated fabricated part.

However, numerous variables can be changed in the software for designing the additive manufacturing build, such changes having an impact on the additively built object (workpiece plus other elements such as supports and integrated fixtures) produced by the additive manufacturing process. For example, an orientation in which the workpiece is built can impact on the stresses that occur and tolerances achievable in the additive manufacturing process. Changes in such variables can result in different requirements for the processes in the manufacturing chain carried out before and after the additive manufacturing process.

SUMMARY OF THE INVENTION

According to one aspect of the invention there is provided apparatus for generating instructions for machines of a manufacturing chain used to manufacture a workpiece, the apparatus comprising a processor arranged to receive a model based definition (MBD) of a workpiece including geometric dimensions and tolerances; receive inputs setting an additive build design for building the workpiece based upon the geometric dimensions; generate additive instructions for an additive manufacturing machine of the manufacturing chain based upon the additive build design; determine a prospective intermediate workpiece product expected from an additive build in accordance with the additive build design; determine differences between the prospective intermediate workpiece product and the model based definition of the workpiece; and generate further instructions, such as G-code, for at least one further machine of the manufacturing chain based upon the differences.

Accordingly, the further instructions generated for the further machine of the manufacturing chain take into account how the additive build design impacts on the processing by the further machine. The apparatus may allow a series of nominally identical workpieces to be manufactured using one or more manufacturing chains even of parameters used for the additive build differ for different ones of the workpieces as the instructions generated for the other machines of the manufacturing chain will be adapted to compensate for differing outcomes of the additive build for these different parameters. This may increase the user's freedom in the setup of the additive build and allay concerns of customers that using different manufacturing bureaus for the production of workpieces will result in unacceptable variation in the final workpieces.

The additive build design may comprise data on supports to support the workpiece as it is built in the additive build, layer thickness, 2-dimensional slices of the workpiece corresponding to areas to be consolidated in layers of the additive build, scan parameters and scan paths for an energy beam to take in consolidating the areas, orientation in which the workpiece is built, a location in which the workpiece is built in a build volume and material type and properties. The scan parameters may comprise point distance, exposure time, spot size and power of an energy beam used to consolidate the material in layers, scanning strategy, such as meander, stripe or checkerboard and hatch distance.

The at least one further machine may comprise a machine located upstream of the additive manufacturing machine in the manufacturing chain. For example, the further machine may supply and/or manufacture material, such as powder, and/or build substrates for use in the additive manufacturing machine and the properties of the material and/or build substrates may be altered based upon the additive build design. For example, in a powder bed additive manufacturing machine, such as SLM, a selected layer thickness for the additive build may impact on the required particle size distribution of the powder used in the build. An orientation, shape and/or size of the workpiece in the additive build may affect the stresses that occur during the build and therefore, a thickness of the build substrate required to resist these forces.

The at least one further machine may comprise a machine located downstream of the additive manufacturing machine in the manufacturing chain. The further machine may comprise a subtractive machine, such as a machine tool, a polishing machine, for example an electrochemical or thermal polishing machine, a support removal machine, for example a wire EDM, a measuring machine, such as a CMM, a further additive manufacturing machine, for example the manufacturing chain may comprise additive manufacturing machines for different materials, a machine for relieving thermal stresses in the intermediate workpiece product, such as through a heat and/or pressure treatment and/or a machine for reconditioning the build substrate, such as a grinding machine.

The processor may be arranged to generate the further instructions for the subtractive machine based upon expected dimensions of the intermediate workpiece product and the required tolerances specified for the workpiece in the MBD. An orientation of a surface of the workpiece in the additive build may affect how close the additive build is to a nominal workpiece design. The processor may be arranged to generate the further instructions for at least one subtractive machine to remove material from the intermediate workpiece product in order to achieve the nominal workpiece design specified in the MBD based on differences between dimensions of the prospective intermediate workpiece product and the geometric dimensions specified in the MBD.

The processor may be arranged to generate the further instructions for the subtractive machine based upon features added to the MBD of the workpiece in the additive build design.

The additive build design may comprise the addition of an allowance to the workpiece, for example, such that workpiece can be manufactured in the additive manufacturing machine. The processor may be arranged to determine if an allowance has been added and generate the further instructions for at least one subtractive machine for removing the allowance from the intermediate workpiece product. The additive build design may comprise the addition of a feature to be used with machines of the manufacturing chain downstream of the additive manufacturing machine. For example, the feature may be mounting formations for mounting the intermediate workpiece product in machines of the manufacturing chain downstream of the additive manufacturing machine, a landmark feature for use as a datum in a measurement process and/or an identification tag used for tracking the workpiece within the manufacturing chain. The processor may be arranged to generate the further instructions for a subtractive machine of the manufacturing chain to remove the feature once the feature is no longer required. The processor may be arranged to add such features to the additive build design based upon knowledge of the requirements of machines in the manufacturing chain.

The processor may be arranged to generate the further instructions for the polishing machine based upon an allowance incorporated into the additive build to be removed by the polishing machine.

The processor may be arranged to generate the further instructions for the support removal machine based on supports included in the additive build design. The supports required in an additive manufacturing build will vary with changes in the orientation of the workpiece in the build. Accordingly, the actions of a machine for removing the supports may differ dependent on the number, locations and types of support.

In one embodiment, the supports are supports removed by application of a force to each support in a specified direction, such as supports as disclosed in WO2015/019070. The processor may be arranged to generate instructions for a subsequent machine based on the supports of the additive build design such that the subsequent machine generates a force on each support in the specified direction for removal of the support.

The processor may be arranged to generate the further instructions for a machine for reconditioning the build substrate based on whether additively built elements, such as supports, can remain on the build substrate for a subsequent additive build. For example, the further instructions may set an extent to which a grinding machine grinds the build substrate once the workpiece has been detached from the build substrate.

The processor may be arranged to generate the further instructions for the measuring machine based upon landmark features added to the workpiece during the additive build. The further instructions may cause the measuring machine to find a location of each of the landmark features.

According to a second aspect of the invention there is provided a data carrier having machine-readable instructions stored thereon, wherein the machine-readable instructions, when executed by a processor, cause the processor to receive a model based definition (MBD) of a workpiece including geometric dimensions and tolerances; receive inputs setting an additive build design for building the workpiece based upon the geometric dimensions; generate additive instructions for an additive manufacturing machine of the manufacturing chain based upon the additive build design; determine a perspective intermediate workpiece expected from an additive build in accordance with the additive build design; determine differences between the prospective intermediate workpiece product and the model based definition of the workpiece; and generate further instructions, such as G-code, for at least one further machine of the manufacturing chain based upon the differences.

According to a third aspect of the invention there is provided apparatus for generating instructions for an additive manufacturing machine of a manufacturing chain used to manufacture a workpiece, the apparatus comprising a processor arranged to receive a model based definition (MBD) of a workpiece including geometric dimensions and tolerances, generate an additive build design for building the workpiece based upon the geometric dimensions, inputs and known properties of and/or processes to be carried out by other machines in the manufacturing chain, and generate additive instructions for an additive manufacturing machine of the manufacturing chain based upon the additive build design.

According to a fourth aspect of the invention there is provided a data carrier having machine-readable instructions stored thereon, wherein the machine-readable instructions, when executed by a processor, cause the processor to receive a model based definition (MBD) of a workpiece including geometric dimensions and tolerances, generate an additive build design for building the workpiece based upon the geometric dimensions, inputs and known properties of and/or processes to be carried out by other machines in the manufacturing chain, and generate additive instructions for an additive manufacturing machine of the manufacturing chain based upon the additive build design.

The processor may be arranged to generate the additive build design based upon a surface of the workpiece that is to be subjected to material removal in a process, such as machining, carried out by a subsequent machine of the manufacturing chain. The processor may generate a scan pattern taking into account the surface that is to be subjected to material removal. The scanning strategy may comprise not generating border (hull) scans for surfaces that are be subjected to material removal. Not carrying out the border scans, which are relative slow compared to the core scans, may reduce the time it takes to carry out the additive build.

According to a fifth aspect of the invention there is provided a manufacturing chain for manufacturing a workpiece, the manufacturing chain comprising an additive manufacturing machine, at least one further machine and apparatus according to the first and/or third aspects of the invention for generating instructions for the additive manufacturing machine and the at least one further machine.

The data carrier may be a non-transient data carrier, such as volatile memory, eg RAM, non-volatile memory, eg ROM, flash memory and data storage devices, such as hard discs, optical discs, or a transient data carrier, such as an electronic or optical signal.

BRIEF DESCRIPTION OF THE DRAWINGS

Embodiments of the invention will now be described, by example only, with reference to the accompanying drawings, in which:—

DESCRIPTION OF EMBODIMENTS

Figure 1:
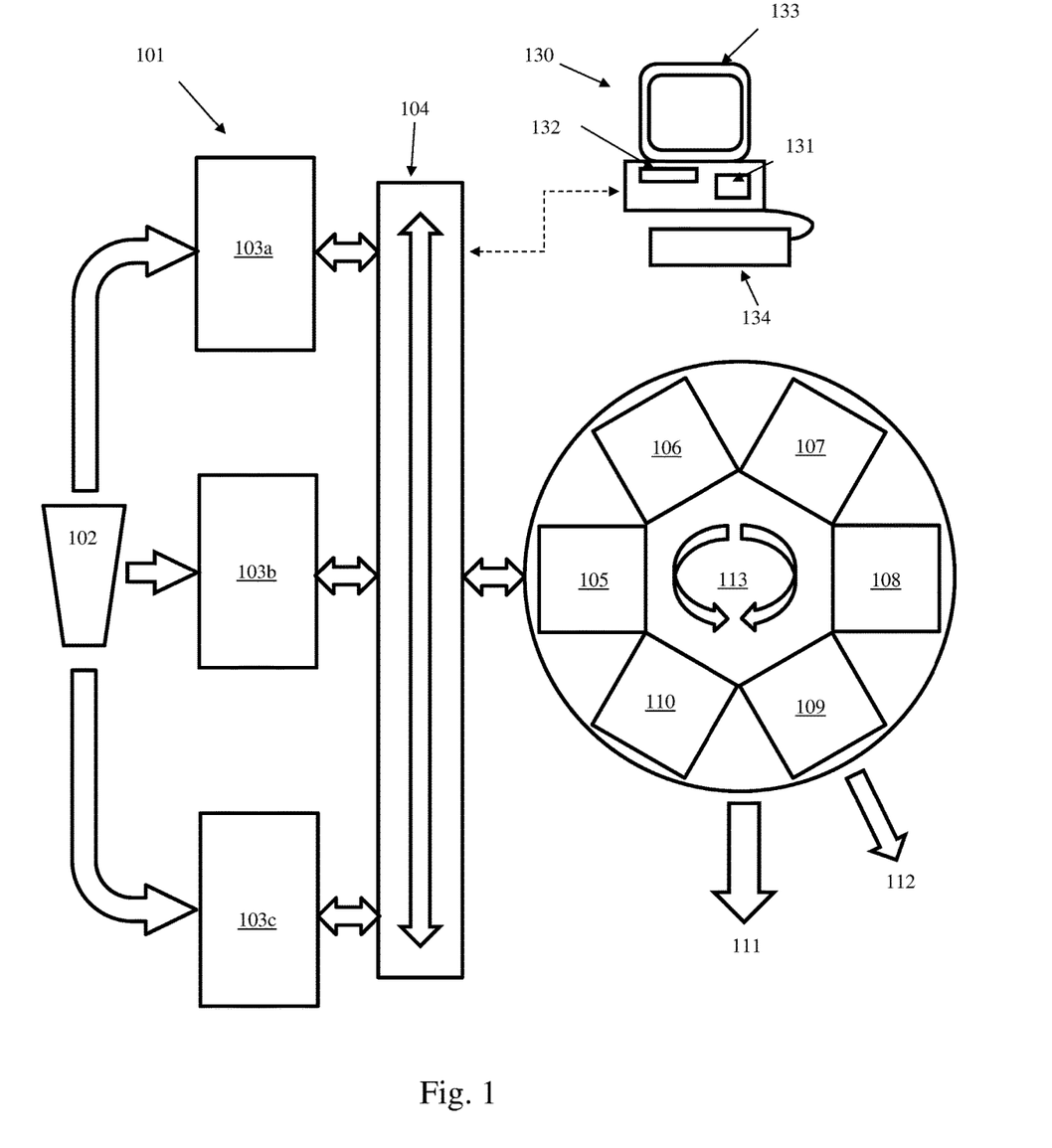
FIG. 1 is a schematic of a manufacturing chain for manufacturing a workpiece, the manufacturing chain including an additive manufacturing machine.

Referring to FIG. 1, a manufacturing chain 101 according to the invention comprises a powder supply 102 for supplying powders having different properties to additive manufacturing machines 103a, 103b and 103c. The additive manufacturing machines may be as described in WO2014/207454. The powder supply may supply powder of different materials and/or powder of the same material but different powder properties, such as different particle size distributions and/or morphology.

A transfer conveyor 104 transfers intermediate workpiece products from the additive manufacturing machines 103a, 103b and 103c to a carousel 113 for transferring the intermediate workpiece product between further machines 105 to 110. The transfer conveyor 104 also transfers reconditioned substrate plates from the carousel 113 to the additive manufacturing machines 103a, 103b, 103c for the next build.

Machine 105 is a heat treatment station for relieving thermal stress from the workpiece. Machine 106 is a CNC machine for machining material from the intermediate workpiece. Machine 107 is for polishing of the workpiece. Machine 108 is for the removal of the workpiece from the build substrate and supports, such as an EDM machine. Machine 109 is for inspection of the workpiece and machine 110 is a grinding tool for reconditioning the build substrate.

Arrow 111 indicates removal of a completed workpiece from the manufacturing chain and arrow 112 indicates the provision of validation data relating to the manufacture of the workpiece generated during the manufacturing process. The validation data may be generated by a number of the machines 103 and 105 to 110 of the manufacturing chain.

A computer 130 is connected to the machines 102 to 110 and carousel 113 and controls the machines by generating and sending instructions to the machines 102 to 110, as described below. Computer 130 comprises user interfaces, in this embodiment a keyboard 134 for user inputs, display 133, memory 132 and processor 131. A computer program on memory 132, when executed by the processor 131, causes the computer 130 to execute the steps described below.

Figure 2:
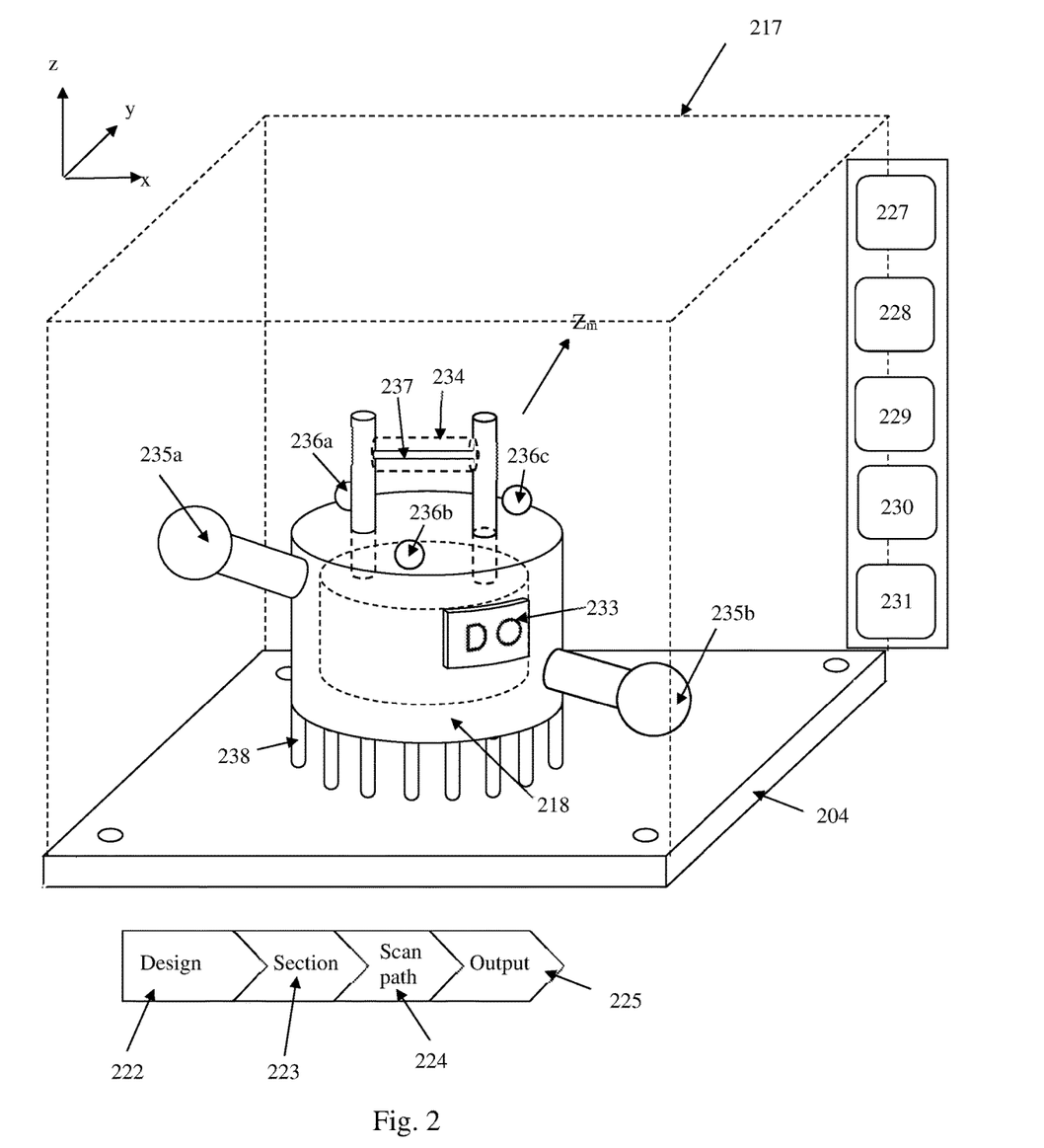
FIG. 2 is a schematic view of an additive build design.
Figure 3:
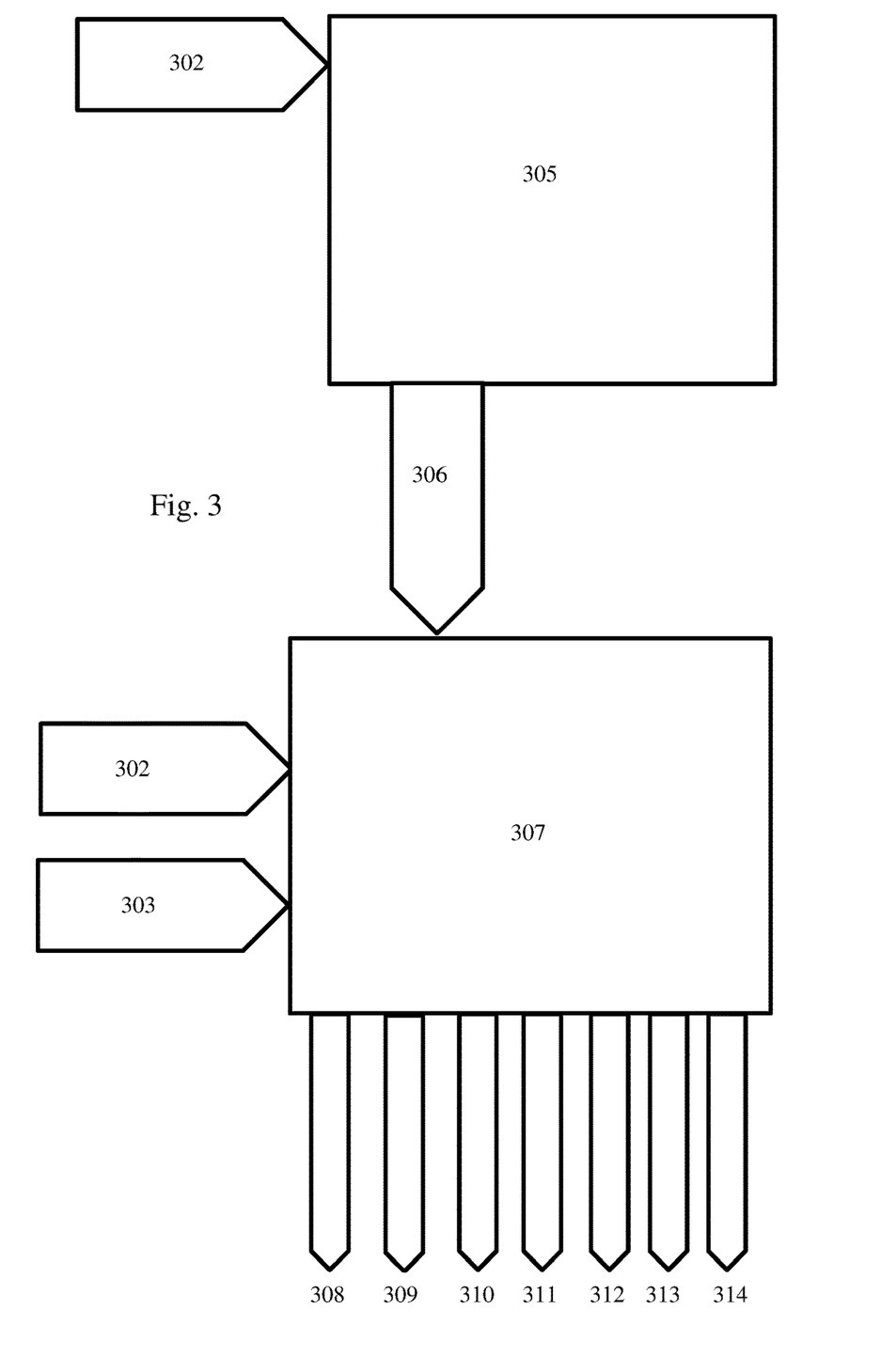
FIG. 3 is a schematic of the design of manufacture software in accordance with an embodiment of the invention for generating instructions for controlling the machines of the manufacturing chain.

Referring to FIGS. 2 and 3, the computer program may comprise a software module 305 for designing the additive build and generating instructions 306 for one of the additive manufacturing machines 103a to 103c to follow in order to build the workpiece. The computer program further comprises a software module 307 for generating further instructions 308 to 314 for the further machines 102 and 104 to 110 for the manufacture of the final workpiece based upon an AM build design and the design intent specified in the CAD data 302.

To build a workpiece/workpieces using the manufacturing chain 101, the user loads geometric data, such as in the form of MBD data 302, defining a workpiece(s) 218 to be built onto computer 130. The computer 103 generates a standard tessellation file(s) (STL file(s)) from the MBD data, the STL file describing the surface geometry of the workpiece(s) 218.

The workpiece 218 is represented in a user interface as shown in FIG. 2. Such a user interface may be displayed on display 133. The user interface comprises a graphical depiction of the build platform/substrate 204 and the available build volume 217. The user interacts with the computer 130 through the input device 134 to orient and locate the workpiece 218 in the build volume 217.

There are four stages in the build process, design, sectioning, determining a scan path and outputting the data for controlling the build. The user can toggle between each stage for each workpiece by selecting the workpiece 218 and then selecting icons/graphical buttons 222, 223, 224 and 225 with a pointing device or by touching a touch screen. The buttons 222 to 225 may change colour or otherwise change appearance to indicate to the user the stage of the process that has been selected for a particular workpiece.

In the design phase, a user can locate and orient the workpiece(s) in the build volume 217. This may be achieved using a pointing device/touch to select a workpiece and appropriate combinations of button/key operations and movement of the pointer/finger to orient and locate the workpiece. Once the user is happy with the orientation and location of the workpiece in the build volume, the user can select workpiece(s) and then the "Section" button 223, which will cause the processor 131 to slice the workpiece(s) and any supports into sections to be built in the layer-by-layer selective laser melting process. By toggling to this stage, the orientation and, possibly, also the location, of the selected workpieces may become fixed, the user having to toggle back to the "Design" stage to change the orientation and location. Re-orientation of the workpiece will require the workpiece to be re-sliced and it is likely that the time it takes to slice an workpiece with a conventional desk-top computer (typically tens of seconds, although it will depend on the shape and size of the workpiece) will be too long to provide a user friendly experience if re-slicing was carried out in real-time with re-orientation of the workpiece. However, suitably fast computers may be able to carry real-time re-slicing of the workpiece within an acceptable time period such that re-slicing of the workpiece in "real-time" with changes in orientation may provide an acceptable user experience. In such a scenario, it would not be necessary to lock in the orientation of the workpiece when the user toggles to the sectioning stage. Rotational orientation of a workpiece about the z-axis and location of a workpiece do not affect the sectioning on the workpiece. Accordingly, in one embodiment, the user is able to alter these attributes after the slicing operation.

The user may be able to select a layer thickness at the Section stage, slices of the workpiece being determined in accordance with the selected layer thickness.

The user can then select one or more workpieces that are at the "Section" stage and toggle to the scan path stage using button 224. During this stage, the processor 131 determines a scan path for the laser when forming each section of the selected workpiece(s) and supports. The scan paths are determined in accordance with a parameter set selected for the workpiece. The parameter set includes laser power, point distance, point exposure time, spot size, hatch distance and possibly other parameters that may define border scans, rotation of the directions of scans between layers, squares of a checkerboard scan pattern and/or stripes of a stripe scan pattern.

The user may be able to view slices of the workpiece and/or scan paths that have already been determined whilst other slices of the workpiece/scan paths are still to be determined, as is described in PCT/GB2016/051635

In a final stage, the scan path and other geometric data is output to the additive manufacturing apparatus for controlling build of the workpiece. The user activates this operation by selecting button 225.

During the design, sectioning and scan path stages, the user can generate supports 238 for supporting the workpiece(s) during the build.

WO2014/207454 describes data structures for the workpieces and supports and is incorporated herein by reference. In particular, WO2014/207454 describes data structures that allow an operation to determine slices and/or scan parameters, for example scan paths, to be carried out on one workpiece without carrying out the operation on another workpiece located within a common build volume.

During the design for additive manufacture, the user may wish to add features to the workpiece for use in subsequent manufacturing steps of the machine chain. The user interface comprises icons 227 to 231 that can be selected by the user for adding features 232 to 236, respectively, to the build.

Features 235a and 235b are mounting formations for mounting the workpiece for subsequent processing, such as in machine tool 106, with the z-axis $Z_m$. The mounting formations comprise three balls (only two of which are shown) connected to the workpiece 218 by stalks, the balls arranged to be received in grooves of a mount on a machine tool. For example, each ball receiving groove may be defined by a pair of parallel rollers, the grooves oriented in different directions to define a position of the workpiece in six degrees of freedom. In this way, the balls in combination with the rollers form a kinematic mount for locating the workpiece 218 in a repeatable position on the machine tool. The user may define the desired orientation Zm of the workpiece 218 in the machine tool and the processor 131 may automatically determine a location for each mounting formation 235a, 235b on the workpiece 218, and therefore, a location in the build volume, in order that the workpiece has this orientation on the machine tool.

Feature 233 is an identification tag for identifying the workpiece. An algorithm is provided for generating identification tags with unique identifiers for each workpiece of the build and possibly, across a series of builds on the additive manufacturing machines 103a to 103c. The identifier may be alphanumeric characters, a 1-D or 2-D barcode or the like that can be read by readers on machines 105 to 110. The identification tag may enable tracking of the workpiece 218 through the manufacturing chain.

Feature 234 is material beyond nominal dimensions of an element 237 of the workpiece 218 that is to be removed by a subsequent subtractive manufacturing process, such as the machine tool or the polishing machine. The material 234 may be added because the element 237 of the workpiece is deemed too small/fragile to manufacture using the additive manufacturing process or may be a result of limitations of the additive manufacturing machine to produce features to the dimensions specified in the MBD/STL file Features 236a, 236b, 236c are landmark features for use as a datum in a measurement process carried out by the measurement machine 109 and, possibly, a probe attached to the machine tool 106. In this embodiment, the landmark features 236a, 236b, 236c are spheres that can be measured with a contact or optical probe to determine centres of the spheres. The measured position of the sphere centres can be used to determine a position of the workpiece in 6 degrees of freedom. A subsequent subtractive manufacturing process may comprise measuring the landmark features to determine a position of the workpiece before or during the subtractive process. A location of elements of the workpiece to be machined or other features, such as an allowance, to be removed relative to the landmark features may be deduced from the geometric data used to drive the additive manufacturing process, i.e. as both the landmark features and the element/features to be machined have been built using the additive manufacturing process, their relative positions are known within the tolerances achievable with the additive manufacturing process.

Additive instructions, such as the scan paths for the laser beam to take in forming each slice, are sent to the required additive manufacturing machine 103a to 103c. A file 306, which may include the additive instructions, specifying features of the additive build determined by module 305 is sent to be module 307 along with the MBD data 302 for workpiece 318.

The module 307 determines further instructions for the further machines 102 and 105 to 110 of the manufacturing chain based upon the additive build data and the MBD data. The module 307 determines an intermediate workpiece product that will be produced in an additive build in accordance with the build data and how this intermediate workpiece product differs from the workpiece defined in the MBD and generates the further instructions 102 based upon these differences.

Module 307 is arranged to determine from features of the additive build and features of the MBD data 302 the amount, powder type and powder properties, such as particle size and/or virgin or recovered powder, to be delivered by the powder supply 102 and generate instructions 308 to cause the powder supply 102 to supply such powder. Module 307 determines the amount of powder to be delivered from the volume of the material that is being consolidated in the additive build as differences in a layer thickness of consolidated material relative to unconsolidated powder results in build dependent variations in the amount of powder required as the voids formed above the consolidated material need to be filled when a subsequent powder layer is formed. From a known difference between the thickness of the consolidated material and the powder layer and the area of material that is consolidated, the module 307 can determine the amount of powder required for a build. Module 307 determines a powder type from the MBD data 302. The module 307 determines the required powder properties from the layer thickness specified for the additive build and quality requirements, such as material purity, specified in the MBD data. For example, a powder with smaller particle sizes may be required if the user chooses to carry out the build with thinner layers. Virgin powder may be required rather than recovered powder if high material purity is specified in the MBD data.

The software displays to the user different options for manufacturing the workpiece. For example, if the user chooses thinner layers in order to build using the additive machine a workpiece closer to the nominal dimensions specified in the MBD data, this may result in a slower build and stricter requirements on the powder. However, if the user chooses thicker layers, this may result in an additively manufactured workpiece with greater variations from the nominal dimensions, such that the more material has to be removed in subsequent machining of the workpiece in the machine tool 106, but a faster additive build and less strict requirements on the powder. For example, the shadow feature 234 may indicate the actual feature that will be built in the additive manufacturing process relative to the nominal feature 237. The software may allow the user to vary parameters of the additive build, such as layer thickness, laser power, spot size, point distance and exposure time or scanning speed, and in response to variations in these parameters recalculate expected dimensions for the intermediate workpiece product built in the additive manufacturing machine with these new parameters. The computer 130 may also display to the user the impact on subsequent processing, such as subsequent machining. The user can then select the parameters used for the additive build based on these predicted effects on the manufacturing chain 101.

The design of the additive build may impact on the machining processes to be carried out by the machine tool 106 in a number of ways. Firstly, the user may select to add features, such as supports 238, mounting formations 235a, 235b and landmarks features 236a, 236b, 236c, to the workpiece for use in the manufacturing chain. These features may need to be removed in subsequent steps. Removal of the features may be carried out using the machine tool 106. Secondly, the workpiece may be machined to remove unwanted material formed during the additive build. For example, the additive manufacturing machine 103 may be unable to build the workpiece to the nominal dimensions specified in the MBD data. Module 307 generates instructions, such as G-code, 309 for the machine tool 106 to cause the machine tool 106 to remove this material form the workpiece.

The excess material may be machined off by the machine tool 106 to form a workpiece that conforms with (e.g. is nominally identical to) the MBD data. The module 307 may predict the occurrence of excess material from the additive build parameters, such as the layer thickness and orientation of the workpiece within the build volume. In particular, a surface built at an angle to the vertical will comprise a stepped profile as dictated by the layer thickness. Module 307 may determine the stepped profile of surfaces from the additive build data 306 and generate instructions 309 for the machine tool 106 to remove material to modify the stepped surface profile to a flatter surface profile as defined in the MBD data.

Furthermore, an allowance of material may be intentionally added to the additively built workpiece as may be advantageous for purposes, such as to provide additional support for features of the workpiece. For example, small structures of the workpiece may be enlarged to ensure that these features do not deform during the additive manufacturing process. The module 307 may generate instructions 309 for the machine tool 106 to remove such allowances.

The module determines instructions 310 to be sent to the heat treatment tool 105 specifying the parameters, such as length of time and temperature, at which the workpiece should be treated. For example, this may be based on the size of the part and thermal stresses expected to occur in the AM built part as determined from a thermal model.

The module 307 determines instructions 311 to be sent to the machine 107 for polishing of the workpiece. The extent a workpiece requires polishing may be effected by additive parameters that affect the sintering of powder particles to a surface of the workpiece. The module 307 may use a model, such as a thermal model, to predict the amount of sintering that may occur at a surface of the workpiece and generate instructions to the polishing machine 107 based on the predicted thickness of material sintered to a surface of the workpiece.

The module 307 determines instructions 312 to be sent to the EDM machine 108 for the removal of the workpiece from the build substrate and support. The module 307 determines instructions 312 for the EDM machine 308 based upon support structures 323 built in the additive build.

The module 307 determines instructions 312 to be sent to the machine 109 for inspection of the workpiece. The workpiece may be measured at various stages of manufacture in the manufacturing chain. The dimensions to be measured may depend upon the machining and polishing steps to be carried out, as described above, which in turn depend on the design of the additive build.

The module 307 determines instructions 312 to be sent to the grinding tool 110 for reconditioning the build substrate. The extent that the build substrate needs reconditioning for a subsequent additive build may depend upon what had been built on the build substrate. For example, if a bottom support structure is to be the same in two consecutive additive builds, the original additively built support structure may be used in a subsequent additive build. To determine this, the module 307 may receive data 303 on a subsequent workpiece to be manufactured. For example, the module 307 may receive data 303 on whether the workpiece is one of a plurality if nominally identical workpieces to be manufactured by the manufacturing chain.

In addition to the above, manufacture of the workpiece may include a further step of additively consolidating material onto the intermediate workpiece product. For example, the workpiece may comprise different portions of different materials. The module 307 may adapt a build of a later additively built portion of the workpiece based upon the build design for an earlier additively built portion of the workpiece. Each additive machine 103a, 103b and 103c may be for processing a different material, the workpiece transferred using the conveyor 104 to each additive machine 103a, 103b, 103c as appropriate for manufacturing the workpiece.

Figure 4:
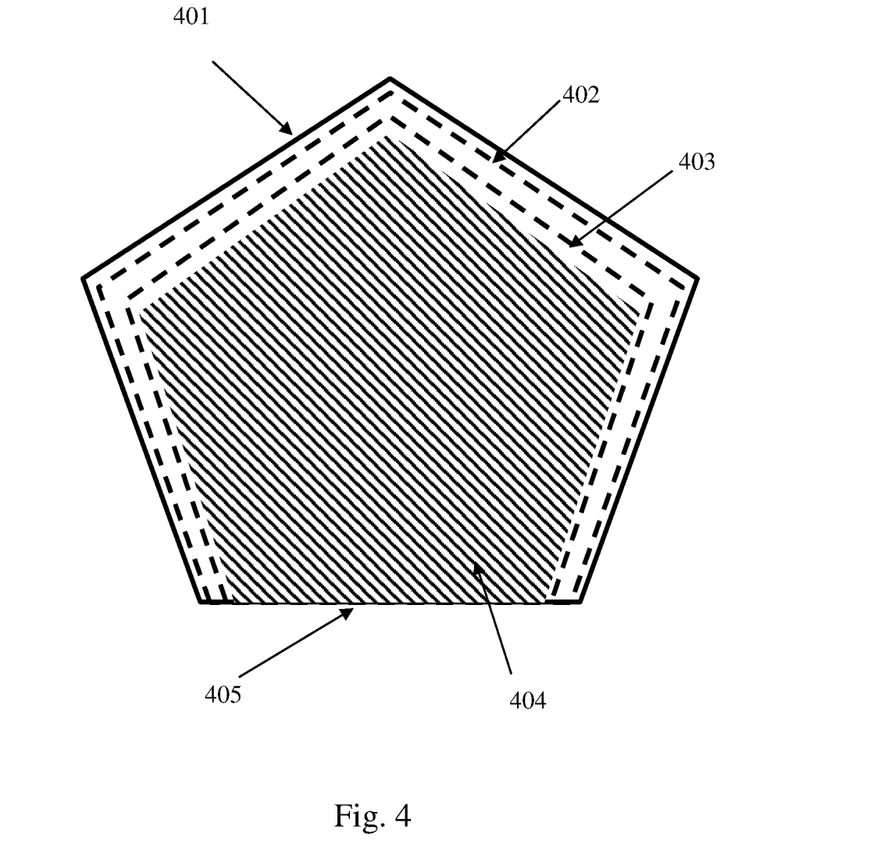
FIG. 4 shows scan paths for forming a slice of a workpiece generated based upon identification of a surface to be machined in a later process in the manufacturing chain.

Scan paths for the additive build may be adapted based upon subsequent steps to be carried out on the intermediate workpiece product by the subsequent machines 105 to 110. FIG. 4 shows a slice of a workpiece 401, wherein a surface 405 has been identified as a surface to be machined in a later process in the manufacturing chain.

For example, the surface 405 to be machined may be identified by a user selection. The processor is arranged to generate scan paths 402, 403 and 404 for the laser beam to follow when solidifying material to form the slice. The scan paths include border (hull) scan paths 402 and 403 and core scan paths 403. As surface 405 has been identified as a surface to be later machined, the processor does not generate border scan paths 402, 403 for this surface 403.

Figure 5:
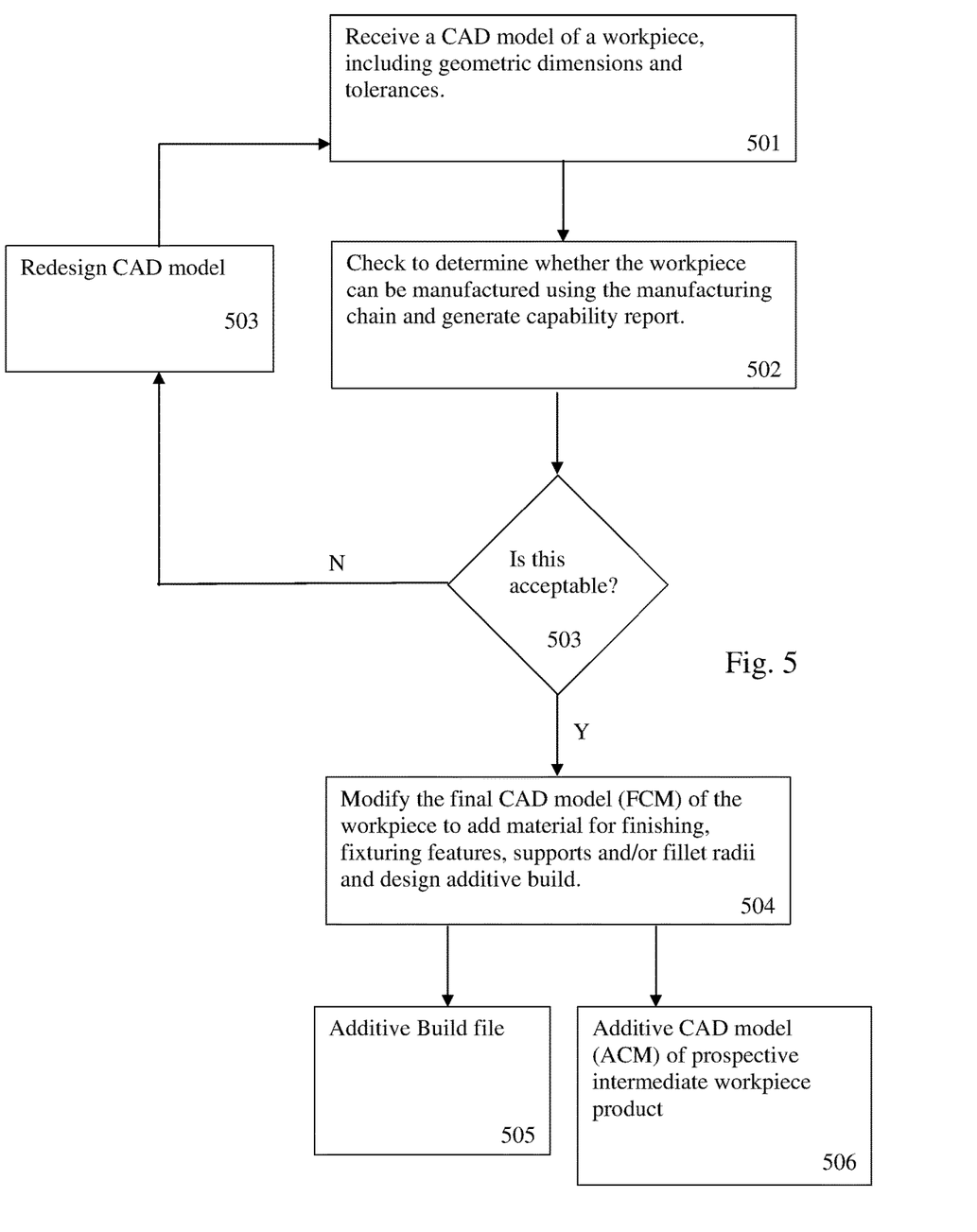
FIG. 5 is a flowchart describing a method carried out by apparatus according to an embodiment of the invention for generating instructions for an additive manufacturing apparatus of the manufacturing chain.

FIG. 5 shows a method carried out by apparatus of the invention, such as computer 130. A CAD model of a workpiece to be manufactured using the manufacturing chain is received 501 by computer 130. The CAD model includes geometric dimensions and tolerances for the workpiece. The computer 130 checks the CAD model to determine whether the workpiece can be manufactured using the manufacturing chain and generates a capability report (or a series of reports on a feature by feature basis, as described below with reference to FIG. 6). The report(s) categorises features of the workpiece into i) features that can be produced by additive manufacturing, ii) features that can be produced by subtractive manufacturing, iii) features that can be produced transformatively, e.g. by polishing, and vi) features that are outside the capability of the manufacturing chain.

In response to the generation of the report, for example as an alert displayed on display 133, a user input is requested to indicate whether it is acceptable for the design of the manufacturing process to continue based upon the identified capability of the manufacturing chain to produce the workpiece. For example, the user may be willing to continue with the manufacture even in circumstances where manufacture of a feature is identified as being outside of the capabilities of the manufacturing chain, such as when the user is aware of other processes, outside of the manufacturing chain that can be used for producing the feature.

If the user input identifies that the report on the capabilities of the manufacturing chain to manufacture the workpiece is unacceptable, the user may redesign the CAD model of the workpiece such that is can be manufactured using the manufacturing chain. This process may be repeated until an acceptable CAD model (so called "Final CAD model (FCM)") is achieved.

The FCM is then modified to add material (allowances) to features to be formed/finished with subtractive/transformative machines of the manufacturing chain, to add fixturing features for mounting the additively built workpiece in fixtures in one or more of the downstream machines 105 to 109 of the manufacturing chain (in most circumstances, a fixture of the CNC machine 106, although other machines may also have fixtures for mounting of the intermediate workpiece product) and fillet radii to corners of the workpiece to be later machined.

In step 504, the additive build is designed based upon the modified model and user inputs. The design of the additive build involves the design of supports for supporting the workpiece during the additive build, duplication and nesting of the workpiece and Z-axis offset of the workpiece from the build substrate 204. Other build parameters, such as orientation in which the workpiece is to be built, layer thickness and scan parameters may have to be specified earlier in order to generate the capability report (as described in more detail below). From these settings, scan paths of an energy beam, can be calculated as described above to generate a build file 505 containing instructions for the additive manufacturing machine 103.

An additive CAD model (ACM) is generated 506 based upon the modifications to the FCM and the locations at which the supports attach to the workpiece to describe an expected prospective intermediate workpiece product to be generated by the additive build. In one embodiment, the ACM may not comprise a CAD description of the supports themselves but only the locations at which the supports attach to the workpiece, as this information may be sufficient for subsequent support removal. However, in another embodiment, the ACM includes a CAD description of the supports.

Figure 6:
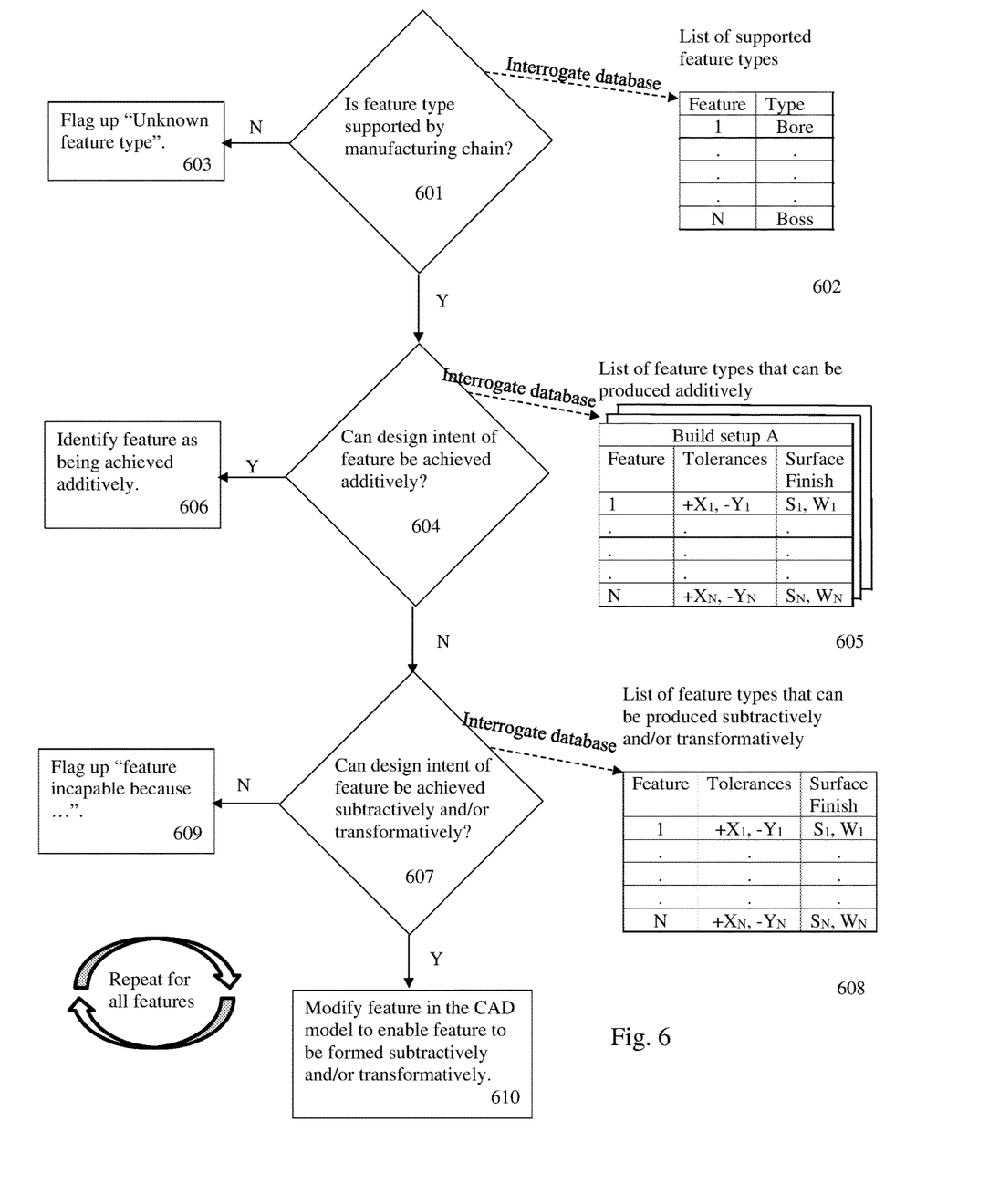
FIG. 6 is a flowchart describing a method of feature analysis according to an embodiment of the invention.

FIG. 6 illustrates in more detail how the capability of the manufacturing chain to produce features of the workpiece is assessed.

On receiving a CAD model of the workpiece, a feature recognition module identifies features of the workpiece and classifies the features into particular types, such as bores, bosses, freeform surfaces, etc. The recognition of such features may be carried out using conventional software.

An assessment is then made on a feature by feature basis as to whether each feature of the workpiece as described in the CAD model can be manufactured using the manufacturing chain. In step 601, for a feature it is determined whether this feature type is supported by the manufacturing chain. This may be achieved by comparing the identified feature type to a set of supported features stored in a database 602. If the feature is unsupported, then the computer 130 generates a flag 603 that the feature is of an unknown type. This may form part of a final capability report or be generated as a feature specific report.

If the feature is supported by the manufacturing chain, the system determines 604 whether the design intent of the feature can be achieved using the additive manufacturing apparatus 103. The system comprises a database 605 specifying a dimensional precision achievable using the additive manufacturing apparatus 103, such as tolerances and surface finish (surface roughness, S, and/or waviness, W). The tolerances specified in the database 605 comprise size tolerances and position tolerances. The database provides different sets of values (or a function) for the achievable dimensional precision for different setups of the additive build. For example, the database may comprise different sets of values for the achievable dimensional precision for different orientations of a feature type, layer thicknesses and scan parameters. Accordingly, the generation of a capability report will depend on parameters selected for the additive build and thus, these parameters for the additive build may have to be specified before an assessment is made as to whether a feature can be manufactured additively. The system may allow the user to change the build parameters in response to the capability report and carry out a reassessment based upon the new build parameters.

If the feature can be produced using the additive manufacturing apparatus alone, the feature is identified 606 as to be built using the additive manufacturing apparatus 103. If not, then then feature is assessed 607 to determine whether the design intent can be achieved by an operation carried out on a machine 105 to 109.

The system comprises a database 608 specifying the tolerances and surface finish (surface roughness and/or waviness) achievable using subtractive/transformative machines 105 to 109. Like database 605, the tolerances specified in the database 608 comprise size tolerances and position tolerances. In step 607, the tolerances and required surface finish specified for the feature in the CAD model are compared to the achievable tolerances and surface finish specified in database 608 to determine whether the design intent for feature can be achieved using subtractive/transformative machines 105 to 109. If so, the feature is identified as to be built using at least one of the subtractive/transformative machines 105 to 109 and the CAD model modified 610 to include allowances, datums and/or fixturing to enable the feature to be manufactured using machines 105 to 109.

If the design intent of the feature cannot be achieved using machines 105 to 109, a flag is generated 609 that the manufacturing chain does not have the capability to manufacture the feature. This may form part of a final capability report or be generated as a feature specific report.

This process is repeated for each feature of the workpiece with the final outputs including a capability report and a modified CAD model of the workpiece. The addition to the modified CAD model of the locations of supports built in the additive process gives the additive CAD model (ACM).

Figure 7:
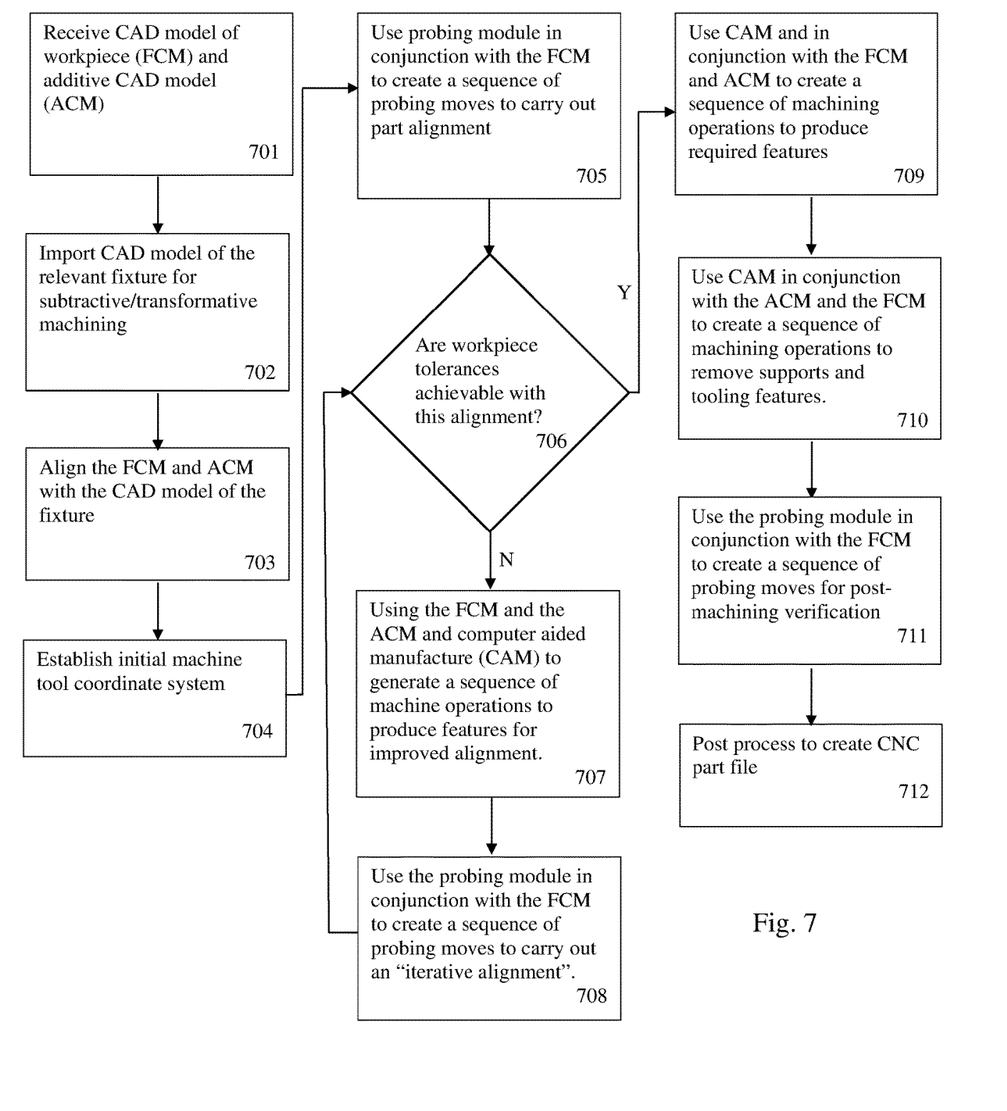
FIG. 7 is a flowchart describing a method carried out by apparatus according to an embodiment of the invention for generating instructions for subtractive manufacturing apparatus of the manufacturing chain.

The FCM and ACM are then used to generate instructions for each machine 105 to 109. FIG. 7 illustrates a method for generating instructions for the CNC machine 106, however analogous methods may be used to generate instructions for the other machines 105 and 107 to 109.

The computer 130 imports/obtains (for example from memory 132) 702 a CAD model of the fixture used in CNC machine 106. In software, the FCM and ACM model are aligned 703 with the fixture model based upon how the additively manufactured intermediate product mounts onto the fixture (which is dependent on the fixturing built on the workpiece). An initial machine tool coordinate system is established 704. Using a probing module and the FCM, a probing sequence for a probe, such as a probe attached to the CNC machine 106, is created 705 and carried out to align a coordinate system of the workpiece with the coordinate system of the CNC machine. In this embodiment, this is achieved by reorienting the coordinate system of the CNC machine 106 based upon a measured orientation of the intermediate workpiece product in the CNC machine 106 using NC-Perfect Part supplied by Metrology Software Products Ltd and described in WO2006/024844. The ACM may be used during this step to establish a scanning sequence that avoids unwanted collisions with features of the intermediate workpiece produce, such as fixturing and allowances, which will not form part of the final workpiece (for example, by setting a back-off distance for the probe based upon the added allowance or fixture).

Due to the surface finish of an additively manufactured part, there may be significant uncertainty in the orientation of the workpiece in the CNC machine 106 such that the required tolerances to be achieved using the CNC machine for a feature are not achievable. Accordingly, a determination 706 is made whether the required tolerances are achievable after part alignment taking into account uncertainty in the workpiece position in the CNC machine 106. If the required tolerances are not achievable then using the FCM, the ACM and computer aided manufacture (CAM), a sequence of machine operations are generated 707 to machine features into the workpiece for improved alignment. For example, one or more surfaces may be machined to improve the surface finish. The probing module may be used again to create 708 a sequence of probing moves to measure the machined surfaces to reduce uncertainty in the position of the workpiece in the machine tool. These steps may be repeated in an iterative fashion until the required tolerances for the workpiece can be achieved in the CNC machine 106.

Computer aided manufacture (CAM) is then used in conjunction with the FCM and the ACM to create 709 a sequence of machining operations to produce the required features on the workpiece. This step comprises comparing the ACM to the FCM to determine differences between the prospective intermediate workpiece product, as defined by the ACM, and intended final geometry of the workpiece, as defined by the FCM. Instructions for the CNC machine are generated based upon the differences.

Computer aided manufacture (CAM) is then used in conjunction with the FCM and the ACM to create 710 a sequence of machining operations to remove the supports and the tooling features, such as fixturing and datums, that are used during the CNC process. (The supports themselves may not be defined in the ACM but the location at which the supports connect to the workpiece are defined and this information may be sufficient to generate instructions of the CNC machine 106 or EDM machine 108 to remove the supports).

The workpiece after the CNC operations may then be polished using machine 107 and measured 711 using the inspection machine 109 or a probe attached to CNC machine 106 for post-process validation.

It will be understood that modifications and alterations can be made to the above-described embodiments of the invention without departing from the invention as defined in the claims. For example, the post additive manufacturing operations, such as the CNC operations, may be based both on differences between the ACM and the FCM and differences measured before or during the CNC machining operations.

The invention claimed is:

1. Apparatus for generating instructions for machines of a manufacturing chain used to manufacture a workpiece, the apparatus comprising a processor arranged to:
   (i) receive a model based definition (MBD) of a workpiece including geometric dimensions and tolerances;
   (ii) receive inputs setting an additive build design for building the workpiece based upon the geometric dimensions;
   (iii) generate additive instructions for an additive manufacturing machine of the manufacturing chain based upon the additive build design;
   (iv) determine a prospective intermediate workpiece product expected from an additive build in accordance with the additive build design;
   (v) determine differences between the prospective intermediate workpiece product and the model based definition of the workpiece; and
   (vi) generate further instructions for at least one further machine of the manufacturing chain based upon the differences,
   wherein step (v) is carried out after step (iv), and
   the at least one further machine comprises a machine located downstream of the additive manufacturing machine in the manufacturing chain.

2. Apparatus according to claim 1, wherein the prospective intermediate workpiece product is determined from the additive build design.

3. Apparatus according to claim 1, wherein the at least one further machine comprises a machine located upstream of the additive manufacturing machine in the manufacturing chain.

4. Apparatus according to claim 3, wherein the further machine at least one of supplies and manufactures at least one of material and build substrates for use in the additive manufacturing machine and the further instructions specify properties of the at least one of the material and the build subtrates for the additive build.

5. Apparatus according to claim 1, wherein the at least one further machine comprises at least one selected from the group consisting of a subtractive machine, a polishing machine, a support removal machine, a measuring machine, a further additive manufacturing machine, a machine for relieving thermal stresses in the workpiece, and a machine for reconditioning the build substrate.

6. Apparatus according to claim 5, wherein the further instructions are instructions for the subtractive machine generated based upon known tolerances achievable with the additive manufacturing machine.

7. Apparatus according to claim 6, wherein the processor is arranged to determine surfaces of the intermediate workpiece product expected to differ from the workpiece defined by the MBD based upon the build design and known tolerances achievable in the additive manufacturing process and generate the further instructions for at least one subtractive machine to remove material from the intermediate workpiece product in order to achieve a workpiece within the tolerances of the MBD.

8. Apparatus according to claim 6, wherein the build design can comprise the addition of an allowance to the workpiece such that workpiece can be manufactured in the additive manufacturing machine, the processor arranged to determine if an allowance has been added and generate the further instructions for at least one subtractive machine for removing the allowance from the intermediate workpiece product.

9. Apparatus according to claim 6, wherein the additive build design can comprise the addition of a feature to be used with machines of the manufacturing chain downstream of the additive manufacturing machine, the processor arranged to generate the further instructions for the subtractive machine of the manufacturing chain to remove the feature once the feature is no longer required in the manufacturing process.

10. Apparatus according to claim 9, wherein the processor is arranged to add the feature to the additive build design based upon knowledge of the requirements of machines in the manufacturing chain.

11. Apparatus according to claim 5, wherein the processor is arranged to generate the further instructions for the polishing machine based upon an allowance incorporated into the additive build to be removed by the polishing machine.

12. Apparatus according to claim 5, wherein the processor is arranged to generate the further instructions for the support removal machine based on supports included in the additive build.

13. Apparatus according to claim 5, wherein the processor is arranged to generate the further instructions for the machine for reconditioning the build substrate based on whether additively built elements can remain on the build substrate for a subsequent additive build.

14. Apparatus according to claim 5, wherein the processor is arranged to generate the further instructions for the measuring machine based upon landmark features added to the workpiece during the additive build.

15. A manufacturing chain for manufacturing a workpiece, the manufacturing chain comprising an additive manufacturing machine, at least one further machine and apparatus according to claim 1, for generating instructions for the additive manufacturing machine and the at least one further machine.

16. A non-transient data carrier having machine-readable instructions stored thereon, wherein the machine-readable instructions, when executed by a processor, cause the processor to:
   (i) receive a model based definition (MBD) of a workpiece comprising geometric dimensions and tolerances;
   (ii) receive inputs setting an additive build design for building the workpiece based upon the geometric dimensions;
   (iii) generate additive instructions for an additive manufacturing machine of a manufacturing chain based upon the additive build design;
   (iv) determine a prospective intermediate workpiece product expected from an additive build in accordance with the additive build design;
   (v) determine differences between the prospective intermediate workpiece product and the model based definition of the workpiece; and
   (vi) generate further instructions for at least one further machine of the manufacturing chain based upon the differences,
   wherein step (v) is carried out after step (iv), and
   the at least one further machine comprises a machine located downstream of the additive manufacturing machine in the manufacturing chain.

17. Non-transient data carrier according to claim 16, wherein the prospective intermediate workpiece product is determined from the additive build design.

* * * * *